Jan. 9, 1951     D. A. SCHONAUER     2,537,553

COMBINED BUMPER GRILL HITCH

Filed June 15, 1948

INVENTOR.
Dennis A. Schonauer
BY Frank W. Slough
J. H. Slough

UNITED STATES PATENT OFFICE 2,537,553

COMBINED BUMPER GRILL HITCH

Dennis A. Schonauer, Mansfield, Ohio

Application June 15, 1948, Serial No. 33,105

2 Claims. (Cl. 280—33.14)

My invention relates to a bumper construction for automotive vehicles and has particular reference to a combined bumper-grill-hitch for use with tractors.

It is an object of my invention to provide a combined bumper-grill and hitch structure which may be securely mounted upon a tractor or other automotive vehicle and which may be so constructed that it will serve as a multiple purpose bumper when the tractor or other vehicle is in operative use and which may be swung away from the front of the said tractor or other vehicle when it is desired to have access to the mechanism disposed below the hood of such tractor or vehicle.

Another object of my invention is to provide a rugged bumper construction which will be highly efficient in use.

A further object of my invention is to provide an improved combined bumper and grill construction having a trailer hitch integrally secured thereto.

Another object of my invention is to provide such an improved bumper-grill-hitch structure composed of but few parts.

Other objects of my invention and the invention itself will become apparent from the following description and appended drawings, in which.

Figure 2:
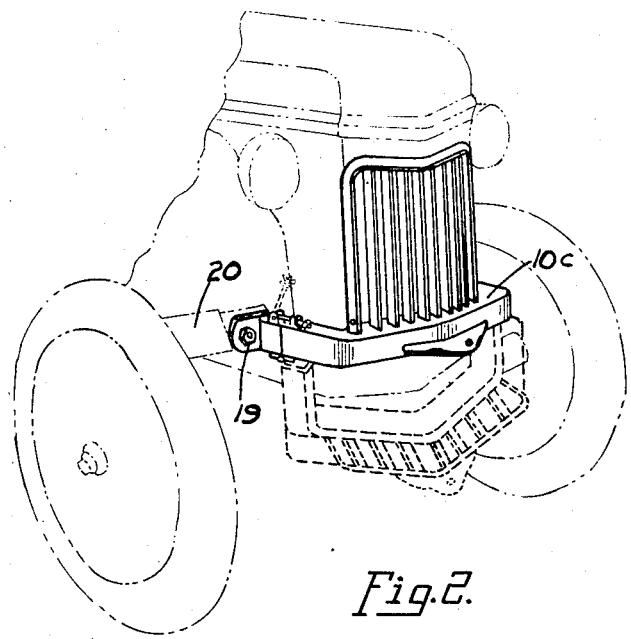
Fig. 2 is a perspective view of the improved structure of my invention as applied to a tractor, said tractor being indicated by broken lines, dotted lines indicating a different position of the bumper-grill-hitch construction.
Figure 1:
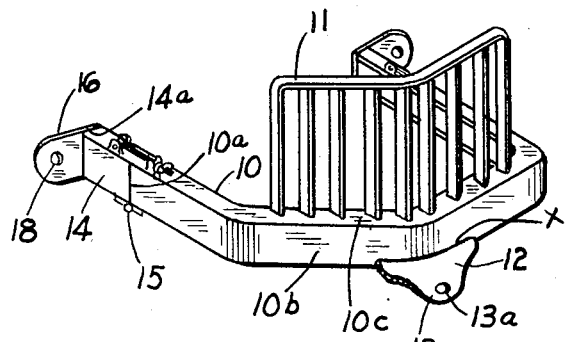
Fig. 1 is a perspective view of the improved combined bumper-grill-hitch of my invention.

Referring to the drawings, the improved bumper construction of my invention is adapted to be secured to the forward end of the tractor, as indicated in Fig. 2. Said bumper structure comprises a generally preferably U-shaped channel shaped bumper 10 having free ends 10a—10a and a yoke portion 10b. The yoke 10b as shown in Figs. 1 and 2 is preferably generally V-shaped. A substantially V-shaped grill 11 is vertically mounted upon the upper face 10c of the yoke 10b and integrally secured thereto, as by welding or the like. A substantially flat trailer hitch member 12 is secured to the forward face of the yoke of the bumper 10 at an intermediate portion thereof, and is generally disposed at right angles thereto; said hitch member 12 is also preferably integrally secured to the bumper as by welding or the like, as indicated at "x". The hitch member 12 is provided with an arcuate forwardly extending portion 13, apertured as at 13a, for the usual purpose that is well understood in the art. The channel shaped bumper 10 at its free ends 10a—10a is hingedly secured to a pair of preferably U-shaped channel shaped bumper extensions 14, said bumper extensions being preferably provided with tapered ends 14a, said taper preferably being sheared off at a 45° angle. A pair of apertured ears or lugs 16 are secured as by welding to the tapered ends of the bumper extensions and form a closure therefore; the apertured portion of said ears extending outwardly from the bumper sides. Bolts 19—19 are projected through the apertures 18 in said ears 16 to secure the bumper construction comprising the integral grill and hitch described to the front axial 20 of the tractor as shown or to the frame or portion of the frame of the tractor as will be readily understood.

In the form of my invention herein illustrated and described a re-inforcing U-shaped strap member 21 is preferably secured as by welding to the inner sides of the U-shaped bumper side end portions, which strap overlaps a point of juncture of the bumper sides and bumper extensions and their hinging connection. The said straps are preferably welded as indicated at "Y" to each of the free ends of the bumper.

Locking means consisting of preferably a rotatably mounted screw-threaded pin 22 terminating in an eye 22a, upstanding lugs 23—23¹, a U-shaped support 24, and a wing nut 25 are disposed adjacent the juncture of the bumper extensions 14 and the free ends of the bumper. The upstanding apertured lugs 23—23¹ and the eye 22a of the pin 22, are adapted to have a bearing 26 projected therethrough, the screw-threaded pin being journalled thereover. When it is disposed to lock the sections 14 and 10 together, as shown in solid lines in Figs. 1, 4 inclusive, the rod is rotated between the upstanding legs of the support 24 and the wing nut 25 is tightened to draw the bumper sections 14 into contiguous relations with the associated free ends of the bumper 10. The bumper-grill and hitch are then in the position shown in solid lines in Fig. 2.

Figure 4:
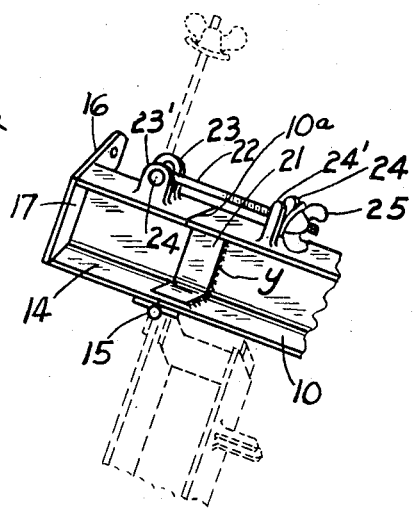
Fig. 4 is an interior view of the end and a portion of the bumper sides of the structure of my invention, dotted lines illustrating optional positions of the locking means and a part of the bumper sides.
Figure 3:
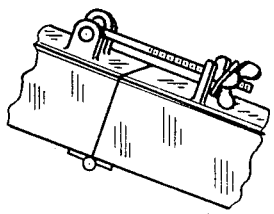
Fig. 3 is an enlarged view of the locking means shown in Figs. 1 and 2, portions of the bumper sides being broken away.

When it is desired to have access to the operative parts of the automotive vehicle of tractor, the wing nut 25 is loosened and the rod 22 rotated to the position shown in dotted lines in Figs. 2 and 4 wherefor the forward end of the bumper construction, the grill and the hitch assumes the position shown in dotted lines in Fig. 2 and no longer interferes with the operator's having access to the operating parts of the tractor; the bumper 10 and its integrally secured grill and hitch swinging downwardly by virtue of the hinge connection 15.

It will be obvious that numerous and extensive departures may be made from the embodiment of my invention herein illustrated and described, but without departing from the spirit of my invention and the scope of the appended claims.

I claim:

1. A bumper construction for tractors or the like comprising a generally V-shaped bumper element, consisting of a main bumper member U-shaped in cross section, a grill mounted upon said bumper, a hitch element integrally secured to the most forwardly disposed portion of the said bumper element, a pair of bumper extension members, hinging means securing each of said bumper extension members to a separate free end of said bumper element, a pair of attachment means adapted to lock said bumper element and its associated grill and hitch members to each said bumper extension member.

2. A bumper construction for tractors or the like comprising a generally V-shaped bumper element, a main bumper member, a vertically disposed grill integrally secured to the yoke portion of said bumper, a substantially flat apertured hitch element integrally secured to the most forwardly disposed portion of said bumper element, a pair of bumper extension members hingedly connected to said bumper element, attachment means integrally secured to the bumper extension members adapted to optionally secure the said members in locked engagement and alignment with the bumper element.

DENNIS A. SCHONAUER.

REFERENCES CITED

The following references are of record in the file of this patent:

UNITED STATES PATENTS

| Number | Name | Date |
|---|---|---|
| 2,378,504 | Roos | June 19, 1945 |
| 2,399,810 | Ketcham | May 7, 1946 |